United States Patent
Ringk et al.

(10) Patent No.: US 11,251,482 B2
(45) Date of Patent: Feb. 15, 2022

(54) CELL HOUSING PLATE FOR THE ARRANGEMENT OF ROUND CELLS

(71) Applicant: Robert Bosch GmbH, Stuttgart (DE)

(72) Inventors: Andreas Ringk, Bamberg (DE); Anton Ringel, Bamberg (DE); Arno Arzberger, Strullendorf (DE); Rudi Kaiser, Bamberg (DE); Silvan Poller, Bamberg (DE); Thomas Kretschmar, Zapfendorf (DE); Christoph Schlund, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/661,344

(22) Filed: Oct. 23, 2019

(65) Prior Publication Data
US 2020/0136098 A1 Apr. 30, 2020

(30) Foreign Application Priority Data
Oct. 26, 2018 (DE) ...................... 10 2018 218 343.0

(51) Int. Cl.
*H01M 50/107* (2021.01)
*H01M 50/183* (2021.01)
*H01M 50/213* (2021.01)

(52) U.S. Cl.
CPC ....... *H01M 50/107* (2021.01); *H01M 50/183* (2021.01); *H01M 50/213* (2021.01)

(58) Field of Classification Search
CPC .. H01M 50/107; H01M 50/183; H01M 50/20; H01M 50/213
See application file for complete search history.

(56) References Cited

U.S. PATENT DOCUMENTS

| | | | | |
|---|---|---|---|---|
| 9,627,665 | B1* | 4/2017 | Hsu ....................... | H01M 50/20 |
| 2009/0104516 | A1* | 4/2009 | Yoshihara ........... | H01M 50/502 |
| | | | | 429/149 |
| 2011/0135975 | A1* | 6/2011 | Fuhr ..................... | H01M 50/20 |
| | | | | 429/53 |
| 2011/0262797 | A1* | 10/2011 | Kim ...................... | H01M 50/20 |
| | | | | 429/149 |
| 2016/0118633 | A1* | 4/2016 | Hongo ................ | H01M 50/213 |
| | | | | 429/121 |

FOREIGN PATENT DOCUMENTS

DE 102015013800 A1 4/2016

* cited by examiner

*Primary Examiner* — Maria Laios
*Assistant Examiner* — Adam J Francis
(74) *Attorney, Agent, or Firm* — Michael Best & Friedrich LLP (57) ABSTRACT

A cell housing plate for the arrangement of round cells, comprising a cover plate arranged on the top side of the cell housing plate, and a base plate arranged opposite the cover plate on the underside of the cell housing plate, wherein the cover plate and the base plate have a plurality of cut-outs arranged opposite each other for receiving the round cells, wherein the cut-outs each have a collar pointing radially towards the inside of the cut-out for receiving a sealant, and an opening arranged inside the collar for passage of the round cells, wherein the cover plate and the base plate are arranged relative to each other such that the cut-outs of the cover plate and the opposite cut-outs of the base plate form cavities for receiving sealant for sealing the round cells which may be arranged inside the cell housing plate.

14 Claims, 8 Drawing Sheets

CELL HOUSING PLATE FOR THE ARRANGEMENT OF ROUND CELLS

BACKGROUND OF THE INVENTION

The present invention is based on a cell housing plate for the arrangement of round cells comprising a cover plate arranged on the top side of the cell housing plate, and a base plate arranged opposite the cover plate on the underside of the cell housing plate. The invention is also based on a system for arranging round cells comprising at least two cell housing plates as described above, arranged above each other, and a plurality of round cells arranged inside the cell housing plates. The invention is also based on a method for arranging round cells inside such a cell housing plate.

It is known to use cell housing plates for the arrangement of battery cells, in particular for the arrangement of round cells. In order to allow effective cooling of the round cells arranged inside the cell housing plates, the round cells must be arranged inside the cell housing plate so as to be sealed against the outside.

SUMMARY OF THE INVENTION

According to a first aspect, the object of the invention is a device with the features of the cell housing plate as claimed, a system as claimed, and a method as claimed. Further features and details of the invention arise from the respective subclaims, the description and the drawings. The same features and details described in connection with the device according to the invention evidently also apply in connection with the system according to the invention and the method according to the invention, and respectively vice versa, so that with respect to the disclosure of the individual aspects of the invention, mutually interchangeable reference may always be made.

The cell housing plate according to the invention serves in particular for sealing and fixing round cells which may be arranged inside the cell housing plate. The advantage of the cell housing plate lies in particular in that, due to its design according to the invention, a sealed arrangement of round cells is possible, in which the seals remain undamaged during its formation. Thus not only is a simplified arrangement of battery cells inside a cell housing plate achieved, but also a greater component tolerance is obtained which reduces the production costs of said cell housing plates. Furthermore, the mechanical fixing of the cells inside a cell housing plate is significantly improved.

The cell housing plate according to the invention for the arrangement of round cells may preferably be used in a motor vehicle, in particular an electric or hybrid vehicle. Also, use of the cell housing plate according to the invention in trucks, cranes, forklifts, ships, aircraft or stationary systems is conceivable.

The cell housing plate according to the invention for the arrangement of round cells comprises a cover plate arranged on the top side of the cell housing plate, and a base plate arranged opposite the cover plate on the underside of the cell housing plate. The cover plate and the base plate here have a plurality of cut-outs arranged opposite each other for receiving the round cells, characterized in that the cut-outs each have a collar pointing radially towards the inside of the cut-out for receiving a sealant, and an opening arranged inside the collar for passage of the round cells. According to the invention, the cover plate and the base plate are here arranged relative to each other such that the cut-outs of the cover plate and the opposite cut-outs of the base plate form cavities for receiving sealant for sealing the round cells which may be arranged inside the cell housing plate.

The cell housing plate according to the invention, which is preferably composed of two parts, a cover plate and a base plate, is advantageously designed to be cuboid and for example is intended to receive a plurality of round cells arranged next to each other and/or one behind the other. The cell housings in the context of a stable arrangement are here preferably made of a metal material, in particular a copper material, an aluminum material or a ferrous material or similar. The cut-outs in the cover plate and base plate according to the invention, in particular the collars arranged inside the cut-outs, are here preferably formed so as to correspond to each other in shape such that they form cavities arranged inside the cell housing plate for receiving sealant. A cavity in the context of the invention is an intermediate space or hollow space which can be filled with a sealant. The sealant, provided according to the invention for sealing round cells which may be arranged inside the cell housing plate, may alternatively or cumulatively also be formed as a mastic or similar which, as well as sealing the cells, is also suitable for fixing the round cells inside the cell housing plate.

The collar according to the invention, which points towards the interior of the cut-outs and serves to receive a sealant, is in the present case a material region formed by the cut-outs, preferably at least partially annular and in each case set back from the surface of the cover plate and the base plate. The preferably at least partially annular cut-outs may here take different shapes and for example be formed oval, as a pointed oval, flat or concave or similar. Furthermore, the cut-out may be formed unevenly and for example have a chamfer pointing either towards the opening of the collar or away from the opening. The collar according to the invention, which is defined by two mutually opposing cut-outs, may be formed flush with the surface of the cover plate or base plate or with an offset to the surface of the cover plate or base plate. Furthermore the collar, the opening arranged inside the collar, may run around the full circumference or only around the partial circumference. With a view to an insertion-friendly design, the collar may furthermore be formed such that it tapers radially towards the inside of the opening arranged inside the collar. Alternatively, it is also conceivable that the collar is formed in steps and has at least one step which is preferably oriented planar-parallel to the surface of the cover plate and/or base plate.

With a view to simple, economic manufacture and suitability for mass production of the cell housing plate according to the invention, it may also in particular be provided that the cover plate and/or the base plate are injection-molded. By use of an injection-molding process, in particular high-quality, strong cell housing plates may be produced. Such an injection-molding process is here suitable in particular for a cell housing plate according to the invention which is preferably formed from two pieces, comprising a cover plate and a base plate. Thus in the context of separate production of a cover plate and base plate by means of an injection-molding process, it is possible to omit any finishing processes for machining undercuts and cavities, e.g. by means of a milling process or similar. The cover plates and base plates produced by a separate injection-molding process may then easily be connected together in a separable or inseparable fashion by form fit, force fit or substance-bonding.

With a view to simple and straightforward supply of sealant for sealing round cells which may be arranged inside the cell housing plate, according to the invention it may furthermore be provided that the cover plate and base plate each have at least one opening arranged inside the collar of the cut-outs for introduction of a sealant, and at least one opening arranged inside the collar for air discharge. The opening for air discharge here in particular serves for simple supply of sealant in that the cavities formed by the cut-outs, in particular formed by the collars arranged inside the cut-outs, need not be evacuated before supply of the sealant.

With a view to particularly effective air discharge, it may furthermore be provided that the opening for introduction of a sealant and the opening for air discharge are arranged on mutually opposing sides of the collar. Here, the collar may in particular be formed circular, characterized in that the two openings then preferably have a mutual spacing which corresponds to the diameter of the circle. Furthermore, it is conceivable that, as well as only one opening for introduction of sealant and only one opening for air discharge, more than one opening may be arranged inside a cut-out. Furthermore, it is also conceivable that the diameter of the openings may be different or they may be differently shaped, so that e.g. the shape of the opening for introduction of a sealant may be adapted to the shape of the sealant supply means.

In the context of a simple and economic filling of the cavities with a sealant, according to the invention it may furthermore be provided that the cavities formed by the cut-outs of the cover plate and base plate are connected together by means of a channel. By connecting several cut-outs or by connecting the cavities formed by the cut-outs, it is possible to fill a plurality of cavities simultaneously by means of only one sealant supply means. In particular, this avoids the need for complex and structurally complicated filling equipment for filling the cavities with sealant.

With a view to a simple and rapid method of connecting a cover plate and base plate for forming the cell housing plate according to the invention, it is also conceivable that further openings are provided inside the cell housing plate for receiving connecting means. Here, at least two, preferably at least four openings may be provided inside the cover plate and/or the base plate, which in particular are arranged correspondingly to each other, advantageously in the edge regions of the cell housing. Via the cover plate and the base plate, a form-fit, force-fit or substance-bonded connection of the plates may be made in a simple fashion by means of these openings.

According to a second aspect, a further object of the invention is a system for arranging round cells. According to the invention, it is provided here that the system comprises at least two cell housing plates according to the first aspect of the invention arranged above each other, and a plurality of round cells arranged inside the cell housing plates, characterized in that the cell housing plates are arranged relative to each other such that the round cells arranged inside the cell housing plates are each held by a cell housing plate arranged on the top side of the system and a cell housing plate arranged on the underside of the system. Thus the system according to the invention brings the same advantages as have already been described in detail in relation to the cell housing plate according to the invention. The system according to the invention may furthermore, in relation to the injection-molding production, comprise other components, in particular walls or wall parts, or columns, supports or similar for connection of cell housing plates.

A further object of the invention is a battery comprising a cell housing plate as described above, in particular a system as described above.

Furthermore, protection is claimed for a motor vehicle comprising a system as described above, in particular comprising a battery as described above.

According to a third aspect, a further object of the invention is a method for arranging round cells inside a cell housing plate as described above and/or a system as described above. Here, the method according to the invention comprises the step of positioning the round cells inside at least one cell housing plate, the step of filling the cavities arranged inside the at least one cell housing plate with a suitable sealant, and the step of hardening of the sealant. Thus the method according to the invention brings the same advantages as have already been described in detail in relation to the cell housing plate according to the invention and the system according to the invention. The step of filling the cavities arranged inside the at least one cell housing plate according to the invention here preferably takes place via the arranged openings for introduction of sealant. The sealant here may in particular be a plastic and/or a mastic, e.g. a resin, in particular an epoxy resin or a silicone or similar. As a further step, furthermore the cell poles of the round cells may be contacted for switching of the cells.

With a view to a particularly effective filling of the cavities arranged inside the at least one cell housing plate, furthermore in particular it may be provided that several cavities are simultaneously filled with sealant, preferably simultaneously filled by means of the same sealant supply means. In order to achieve this in a particularly simple fashion, it may be provided that the different cut-outs or cavities of the cell housing plate according to the invention are connected together. This may be achieved as described above, e.g. by means of suitable connecting channels or similar.

In order to achieve a particularly stable and durable seal of the round cells which may be arranged inside the cell housing plate according to the invention, it may furthermore be provided according to the invention that before the cavities are filled with a suitable sealant, a surface treatment of the surfaces of the cavities takes place to minimize the interfacial diffusion. Minimizing the interfacial diffusion may here be achieved for example by maximizing the interaction between the sealant and the joint partners by the supply of potential interaction groups, such as metal oxides or organic components, to the surfaces of the cavities. The interaction groups guarantee a firm connection to the sealant and thus create a more compact network, which minimizes the interfacial diffusion. Alternatively or additionally to a supply of potential interaction groups, surface treatment may take place also by means of laser treatment, in particular by means of laser structuring of the cavities of the cell housing plates, characterized in that the laser treatment in particular achieves a roughening of the surface. By roughening the surface, both the diffusion path is extended—which already minimizes the interface diffusion—and a higher reaction affinity is created for a reaction with said potential interaction groups which may be supplied. Alternatively, a surface treatment may also take place by means of sand-blasting, in particular comprising additional silicate coating of the surfaces of the cavities or by means of plasma treatment or similar.

BRIEF DESCRIPTION OF THE DRAWINGS

Further advantages, features and details of the invention arise from the following description in which exemplary embodiments of the invention are described in detail with reference to the drawings. The features mentioned in the claims and in the description may be essential to the invention both individually and in combination.

The drawings show.

DETAILED DESCRIPTION

In the figures, identical reference signs are used for the same technical features.

Figure 1:
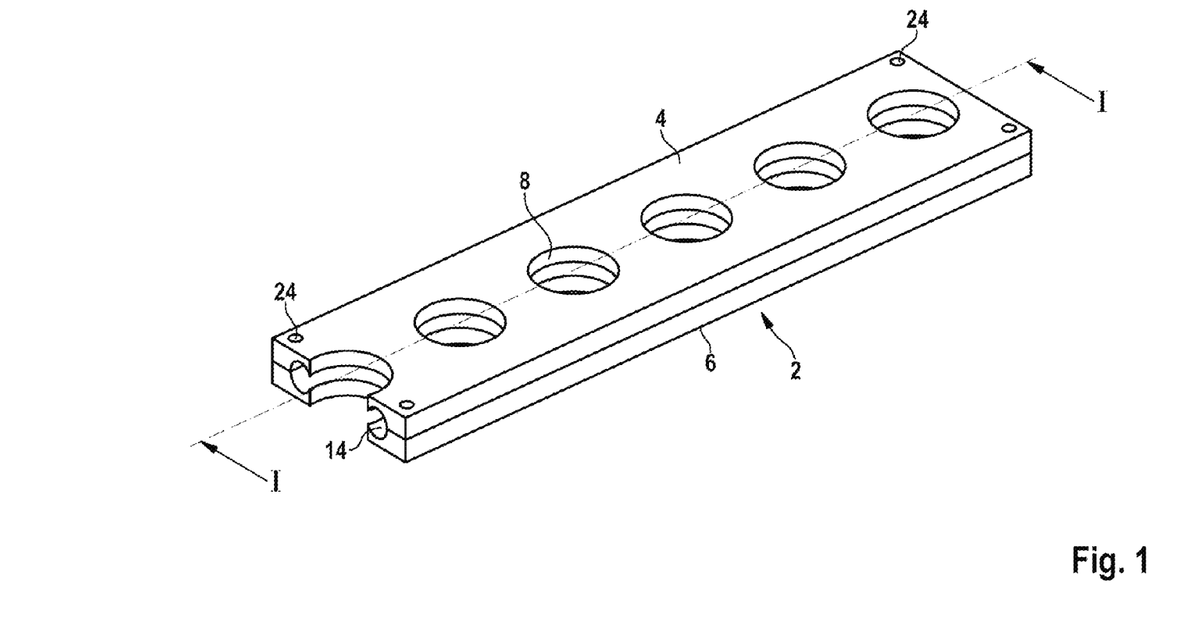
FIG. 1 a spatial view of a cell housing plate according to the invention for the arrangement of round cells, in the assembled state, according to a first exemplary embodiment, FIG. 2 a spatial depiction of a cell housing plate according to the invention for the arrangement of round cells, in a non-assembled state, according to a first exemplary embodiment, FIG. 3 a sectional view of a cell housing plate according to the invention for the arrangement of round cells, in a cross-section along section line I-I from FIG. 1, FIG. 4 a further sectional view of the cell housing plate according to the invention for the arrangement of round cells, in a cross-section along section line I-I of FIG. 1, according to a second exemplary embodiment, FIG. 5 a spatial view of a system according to the invention for the arrangement of round cells, in an unfilled state, FIG. 6 a sectional view of the system according to the invention for the arrangement of round cells, in a cross-section along section line II-II from FIG. 5, FIG. 7 a spatial view of the system according to the invention for the arrangement of round cells in a filled state, FIG. 8 a sectional view of the system according to the invention for the arrangement of round cells, in a filled state, in a cross-section along section line III-III FIG. 7, FIG. 9 a spatial view of a system according to the invention for the arrangement of round cells, in a filled state, according to a further exemplary embodiment.

FIG. 1 shows a spatial view of a cell housing plate 2 according to the invention for the arrangement of round cells 22, in an assembled state, according to a first exemplary embodiment. The cell housing plate 2 according to the invention here comprises a cover plate 4 arranged on the top side of the cell housing plate 2, and a base plate 6 arranged opposite the cover plate 4 on the underside of the cell housing plate 2 and connected to the cover plate 4. The plates 4, 6 may, with a view to a stable and compact arrangement, preferably be formed from a metal material, in particular a copper material, an aluminum material or a ferrous material, and be connected together inseparably or inseparably, e.g. by form fit, force fit or substance bonding. For simple connection of the cover plate 4 and base plate 6, in the present case four openings 24 are arranged in the edge regions of both the cover plate 4 and the base plate 6, via which e.g. rivets, screws or similar may be introduced into the cover plate 4 in order to connect this to the base plate 6. The cell housing plate 2 furthermore comprises six cut-outs 8 arranged next to each other or one behind the other, which are provided for receiving round cells 22. The cut-outs 8 arranged in the cover plate 4 and base plate 6 are for this arranged precisely opposite each other. It is furthermore evident that, by the arrangement of the cut-outs 8 in the cover plate 4 and base plate 6, cavities 14 may be formed inside the cell housing plate 2.

Figure 2:
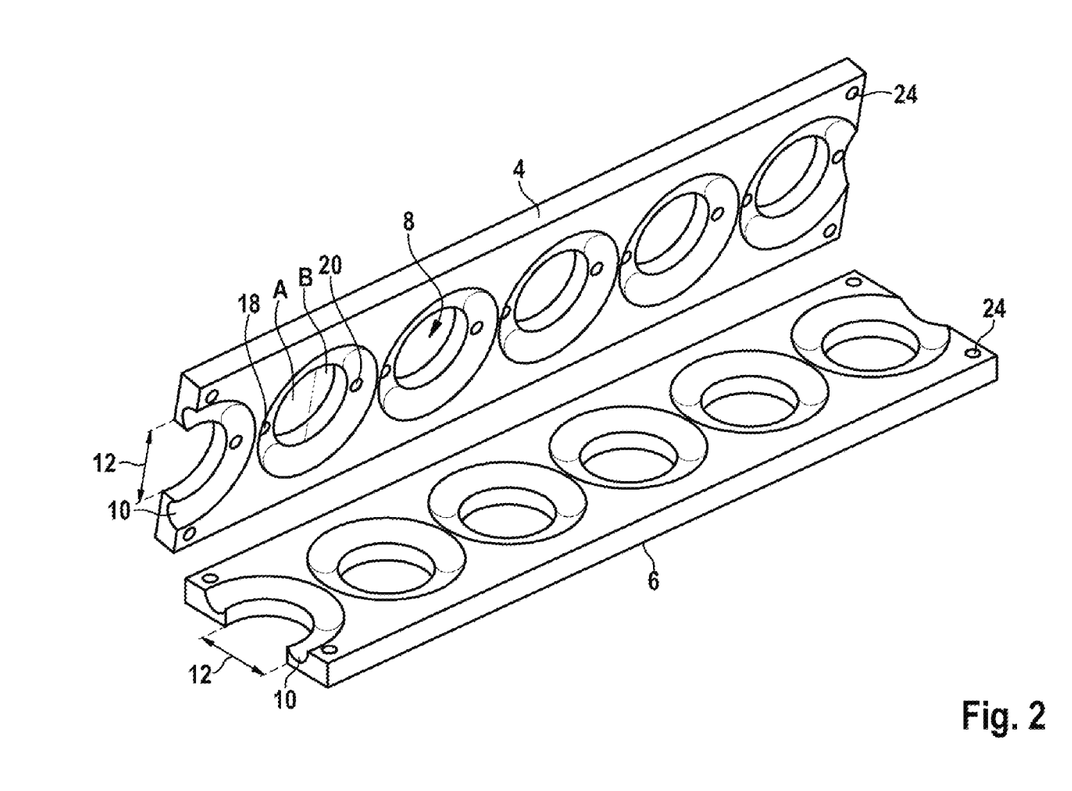

FIG. 2 shows a spatial depiction of a cell housing plate 2 according to the invention for the arrangement of round cells 22, in a non-assembled state, according to a first exemplary embodiment. According to the separate depiction of the cover plate 4 and base plate 6 according to the invention shown in FIG. 2, it is evident that the cut-outs 8 of the cover plate 4 and base plate 6 have a collar 10 pointing radially towards the inside of the cut-outs 8, and an opening 12 arranged inside the collar 10. The collar 10 is here provided to receive a sealant 16, whereas the opening 12 arranged inside the collar 10 is provided for the passage of round cells 22. The shape of the collar is here determined by the shape of the cut-out 8 and, as well as the semicylindrical form shown here, may also have many other possible shapes insofar as the arrangement of the cut-outs 8 of the cover plate 4 and base plate 6 allows the formation of cavities 14 for receiving a sealant 16. The collar 10 according to the invention, defined by the cut-outs 8, may also be formed flush with the surface of the cover plate 4 or base plate 6, or also with an offset to the surface of the cover plate 4 or base plate 6. Furthermore, the collar 10, the opening 12 arranged inside the collar 10, may run around the full circumference or only around part of the circumference. According to the present embodiment, the collar 10 is formed such that it tapers radially towards the inside of the opening 12 inside the collar 10, which allows simple insertion of the round cells 22 and simple supply of sealant 16. Alternatively or additionally, it is also conceivable that the collar 10 is formed in steps and has at least one step which is preferably oriented planar-parallel to the surface of the cover plate 4 and/or base plate 6. In order to guarantee the formation of cavities, it is also possible that the cut-outs 8, in particular the form of the collars 10, the cover plate 4 and the base plate 6, are designed differently. As well as the central openings 12 arranged inside the collars 10 for receiving round cells 12, the collars 10 arranged inside the cut-outs 8 also each comprise an opening 18, arranged in the present case in the edge regions of the collars 10, for introduction of a sealant 16, and each comprise an opening 20 arranged inside the collars 10 for air discharge. The openings 18, 20 arranged in this case in the cover plate 4 may here also be formed in the base plate 6. By the special arrangement of the openings 18 and 20 on mutually opposing sides A and B of the collars 10, in particular air present inside the cavities 14 may be discharged extremely effectively before the introduction of sealant 16, which thus ensures proper filling of the cavities 14 with sealant 16.

Figure 3:
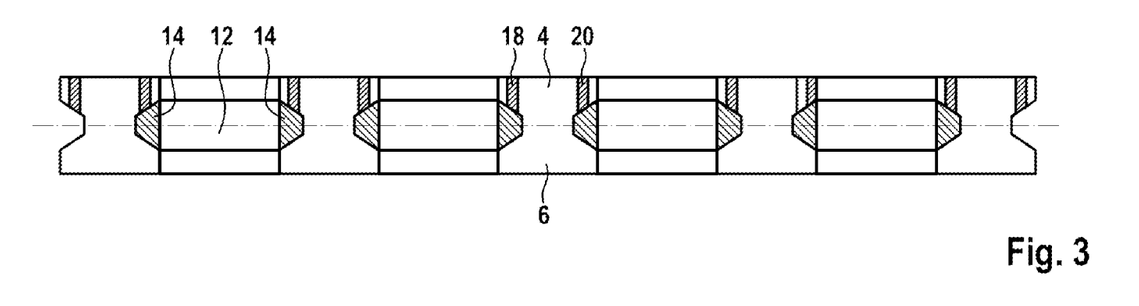

FIG. 3 shows a sectional view of a cell housing plate according to the invention for the arrangement of round cells, in a cross-section along section line I-I from FIG. 1. The sectional view here clearly shows the cavities 14 arranged in the interior of the cell housing plate 2 for receiving sealant 16, and the openings 12 arranged inside the collar 10 for receiving round cells 22. After round cells 22 have been inserted in the openings 12, sealant 16 may be introduced into the cavities 14 via the openings 18, characterized in that the air present inside the cavities is expelled from the openings 20 provided for air discharge.

Figure 4:
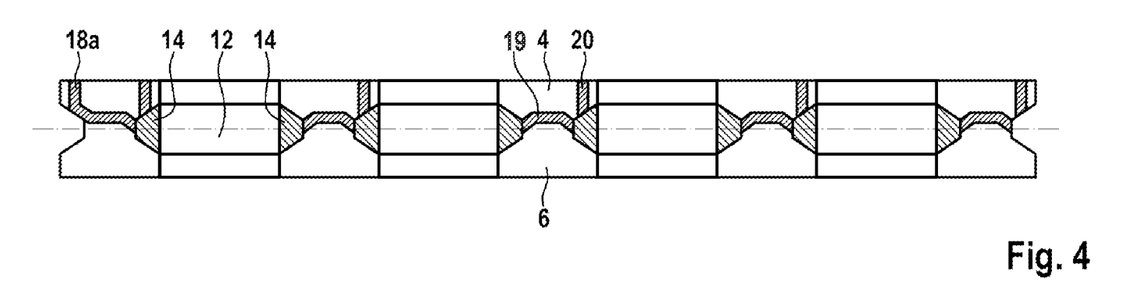

FIG. 4 shows a further sectional view of a cell housing plate 2 according to the invention for the arrangement of round cells 2, in a cross-section along section line I-I from FIG. 1, according to a second exemplary embodiment. In contrast to the first exemplary embodiment according to FIG. 3, the cell housing plate 2 according to the second exemplary embodiment has a passage channel 19 for receiving a sealant 16. By means of this passage channel 19, it is possible to fill all cavities simultaneously or by means of only one sealant supply means via the channel start 18a, characterized in that the air present inside the cavities 14 can be discharged via the respective openings 20. By means of this embodiment, the cell housing plates 2 according to the invention may be filled with sealant 16 rapidly but in a manner which is significantly simpler in terms of design.

Figure 5:
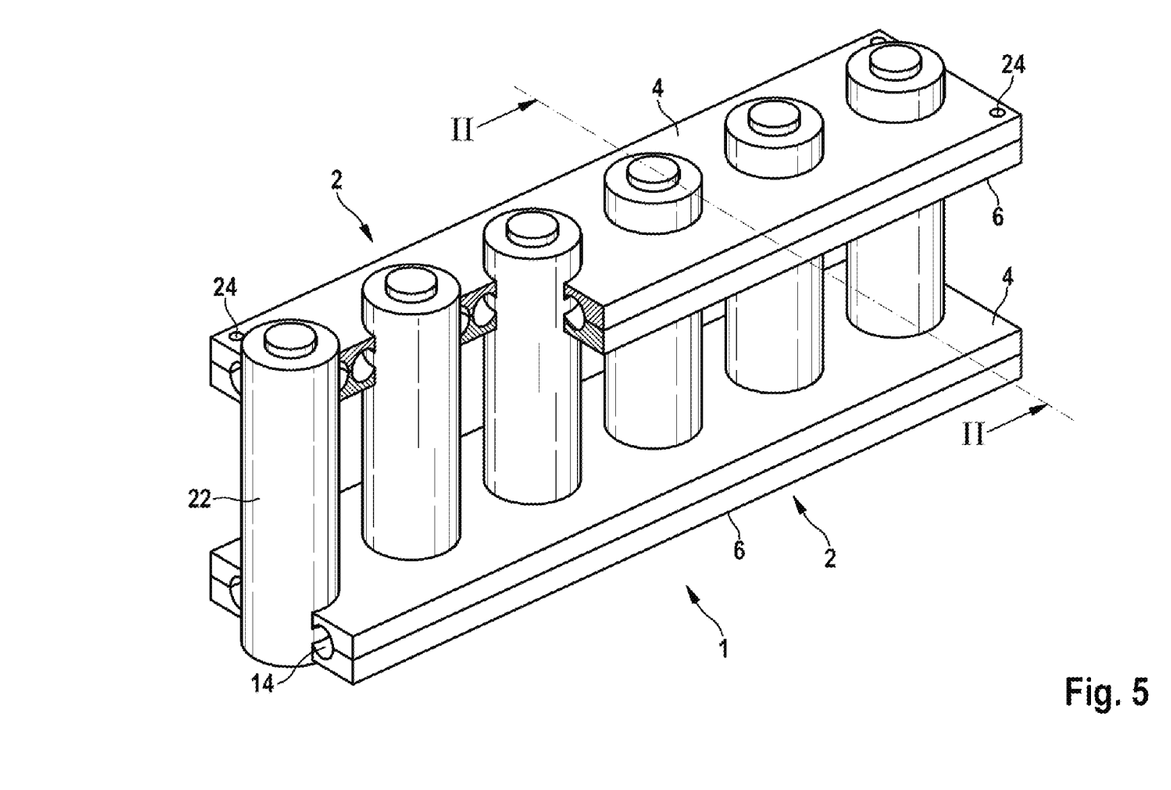

FIG. 5 shows a spatial view of a system 1 according to the invention for the arrangement of round cells 22, in unfilled state. The system 1 according to the invention for the arrangement of round cells 22 here comprises two cell housing plates 2 arranged above each other, and a plurality of round cells 22 arranged inside the cell housing plates 2, characterized in that the cell housing plates 2 are here arranged relative to each other such that the round cells 22 are each held by a cell housing plate 2 arranged on the top side of the system 1 and by a cell housing plate 2 arranged on the underside of the system 1. Inside the cell housing plates 2, each round cell 22 is surrounded by an above-mentioned cavity 14 which is formed by the arrangement of the cut-outs 8 of the cover plate 4 and base plate 6 of the cell housing plates 2 relative to each other. By filling the cavities 14 with a suitable sealant 16 or suitable plastic material, thus the round cells 22 can easily be sealed and/or glued inside the system 1.

Figure 6:
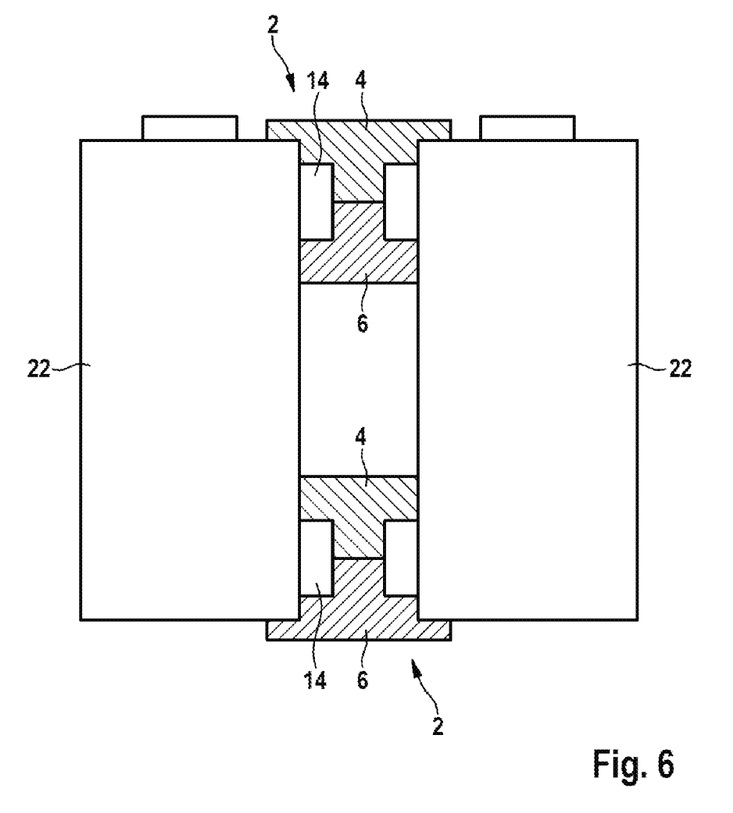

FIG. 6 shows a sectional view of the system 1 according to the invention for the arrangement of round cells 22, in a cross-section along section line II-II from FIG. 5. According to the sectional view along section line II-II, the cavities for receiving sealant 16 arranged inside the cell housing plates 2, and in this case still unfilled, are clearly evident.

Figure 7:
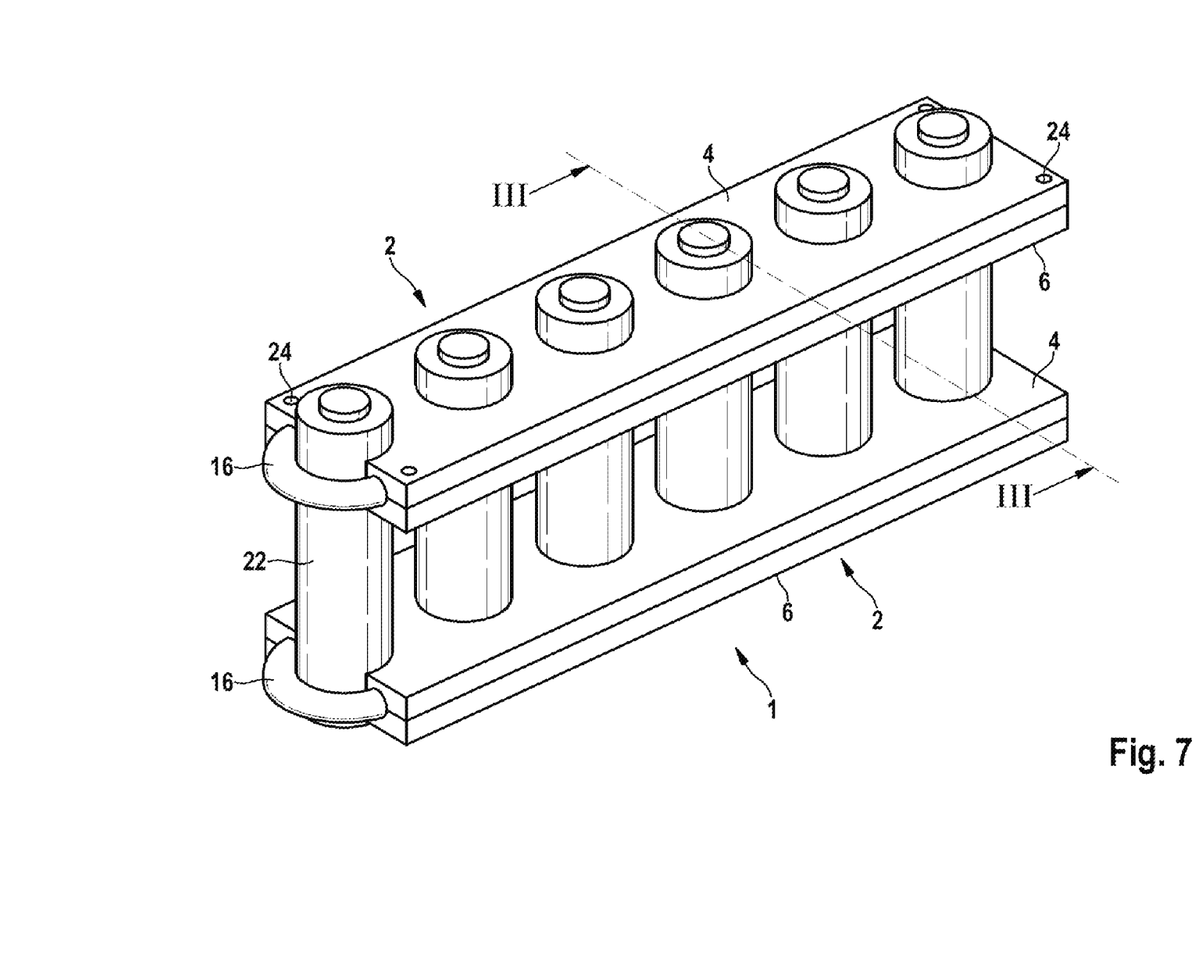

FIG. 7 shows a spatial view of a system 1 according to the invention for the arrangement of round cells 22, in a filled state. In contrast to the depiction in FIG. 5, sealant 16 has now been introduced into the cavities 14 of the cell housing plates 2, whereby the round cells 22 are thus sealed and/or fixed to the cell housing plate.

Figure 8:
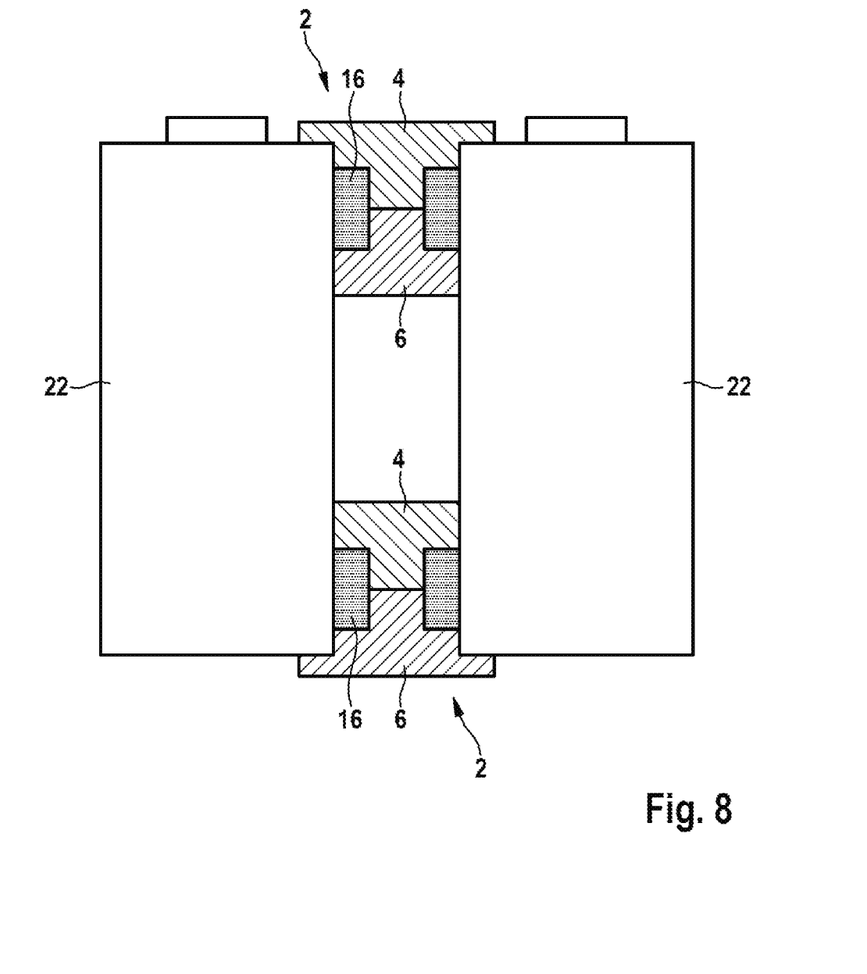

FIG. 8 shows a sectional view of the system 1 according to the invention for the arrangement of round cells 22, in a cross-section along section line III-III from FIG. 7. According to the present sectional view, the inserted sealant 16, which fixes the round cells 22 of a cell housing plate 2 or seals the round cells 22, is here clearly evident.

Figure 9:
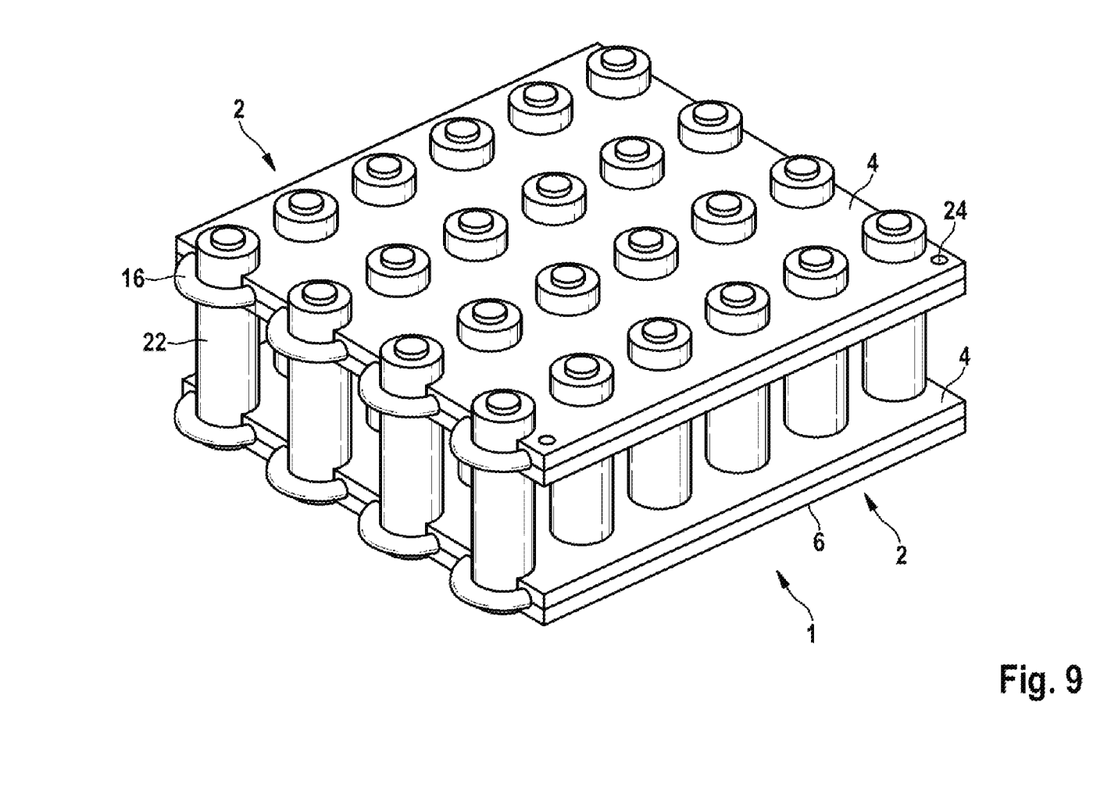

FIG. 9 finally shows a spatial view of a system 1 according to the invention for the arrangement of round cells, in a filled state, according to a further exemplary embodiment. In this exemplary embodiment, the round cells 22 are arranged not in a row but in this case in four or six rows. It is understood that, as well as the arrangements shown of one or four or six rows of round cells, many other possible configurations are conceivable.

By means of the cell housing plate 2 according to the invention, the system 1 according to the invention and the method according to the invention, in particular it is possible to create a sealed arrangement of round cells 22, in which the seals remain undamaged during its formation. In this way, not only is a simpler arrangement of battery cells 22 inside a cell housing plate 2 possible, but greater component tolerances are created, which reduces the production costs of said cell housing plates 2. Furthermore, the mechanical fixing of the cells 22 inside a cell housing plate 2 is also significantly improved.

The invention claimed is:

1. A cell housing plate (2) for the arrangement of round cells (22), the cell housing plate comprising
   a cover plate (4) forming a top side of the cell housing plate (2), and
   a base plate (6) arranged opposite the cover plate (4) and forming an underside of the cell housing plate (2),
   wherein the cover plate (4) and the base plate (6) have a plurality of cut-outs (8) arranged opposite each other and configured to receive the round cells (22),
   wherein the cut-outs (8) each have an annular recess (10) and an opening (12) arranged inside and open to the annular recess (10),
   wherein each of the annular recesses (10) of the cover plate (4) extends only partially through the cover plate (4) and each of the annular recesses (10) of the base plate (6) extends only partially through the base plate (6),
   wherein each of the openings (12) of the cover plate (4) extends completely through the cover plate (4) and each of the openings (12) of the base plate (6) extends completely through the base plate (6),
   wherein the cover plate (4) and the base plate (6) are arranged relative to each other such that each of the openings (12) of the cover plate (4) corresponds to and is aligned with a respective one of the openings (12) of the base plate (6) to form a respective cylindrical opening configured to receive a respective one of the round cells (22), and
   wherein the cover plate (4) and the base plate (6) are arranged relative to each other such that each of the annular recesses (10) of the cover plate (4) corresponds to and is aligned with a respective one of the annular recesses (10) of the base plate (6) to form a respective annular cavity (14) which is open to and surrounds the respective cylindrical opening and which is configured to receive a sealant (16) for sealing the respective one of the round cells (22).

2. The cell housing plate (2) according to claim 1, characterized in that the cover plate (4) and/or the base plate (6) are injection-molded.

3. The cell housing plate (2) according to claim 1, characterized in that the cavities (14) formed by the cut-outs (8) of the cover plate (4) and the base plate (6) are connected together by means of a channel.

4. The cell housing plate (2) according to claim 1, characterized in that the cover plate (4) or the base plate (6) has at least one opening (18) arranged inside the annular recess (10) of the cut-out (8) for introduction of a sealant (16), and at least one opening (20) arranged inside the annular recess (10) for air discharge.

5. The cell housing plate (2) according to claim 4, characterized in that the opening (18) for introduction of a sealant (16) and the opening (20) for air discharge are arranged on mutually opposing sides (A, B) of the annular recess (10).

6. The cell housing plate (2) according to claim 1, characterized in that further openings (24) are provided for receiving connecting means.

7. A system (1) comprising:
   at least two cell housing plates (2) according to claim 1, spaced apart from each other, and
   a plurality of round cells (22) each arranged inside the respective cylindrical opening of each of the cell housing plates (2),
   wherein the cell housing plates (2) are arranged relative to each other such that one of the cell housing plates (2) is arranged at a top side of the system (1) and another one of the cell housing plates (2) is arranged at an underside of the system (1).

8. The system according to claim 7, wherein each of the respective annular cavities (14) is filled with a sealant for sealing the plurality of round cells (22).

9. The cell housing plate (2) according to claim 1, wherein the annular recesses and the openings (12) of the cover plate (4) are symmetrical with the annular recesses and the openings (12) of the base plate (6).

10. A system (1) comprising:
a cell housing plate (2) according to claim 1, and
a plurality of round cells (22) each arranged inside the respective cylindrical openings of the cell housing plate (2),
wherein each of the respective annular cavities (14) is filled with a sealant for sealing the plurality of round cells (22).

11. A method for arranging round cells (22) inside a cell housing plate (2) according to claim 1, the method comprising the steps:
positioning the round cells (22) inside the respective cylindrical openings of the at least one cell housing plate (2),
filling the annular cavities (14) arranged inside the at least one cell housing plate (2) with a suitable sealant (16), and
hardening of the sealant (16) to seal the round cells (22) in the cell housing plate (2).

12. The method according to claim 11, characterized in that several cavities (14) are simultaneously filled by sealant supply means.

13. The method according to claim 11, characterized in that several cavities (14) are simultaneously filled by the same sealant supply means.

14. The method according to one of claim 11, characterized in that before the cavities (14) are filled with a suitable sealant (16), a surface treatment of the surfaces of the cavities (14) takes place to minimize the interfacial diffusion.

* * * * *